United States Patent [19]

Mudge et al.

[11] Patent Number: 4,643,410

[45] Date of Patent: Feb. 17, 1987

[54] COUPLING CONSTRUCTION AND CLAMP THEREFOR

[75] Inventors: Dennis Mudge, Cumberland, R.I.; Joseph Coskie, Shrewsbury; Edward H. Jacobs, Holliston, both of Mass.; David R. Harris, Pawtucket, R.I.

[73] Assignee: American Machine & Science, Inc., Park Ridge, Ill.

[21] Appl. No.: 724,181

[22] Filed: Apr. 15, 1985

[51] Int. Cl.⁴ .................................... B23Q 3/18
[52] U.S. Cl. ........................................ 269/64
[58] Field of Search .............. 269/228, 91–94, 57, 269/63, 64; 51/216 ND, 216 H; 279/5; 74/813 R

[56] References Cited

U.S. PATENT DOCUMENTS

| | | | |
|---|---|---|---|
| 3,049,032 | 8/1962 | Schabot | 269/64 |
| 3,650,522 | 3/1972 | Wermuth et al. | 269/228 |
| 3,961,780 | 6/1976 | Saj | 269/64 |

Primary Examiner—Robert C. Watson
Attorney, Agent, or Firm—Salter & Michaelson

[57] ABSTRACT

A coupling construction and a clamp therefor are disclosed which are operative with improved effectiveness in a workholding system for securing a workpiece at a work station. The coupling comprises a receiver and a carrier, and at least one of the clamps for securing the receiver and the carrier in a coupled position with high clamping pressures. The clamp comprises a clamp body, and a clamping element, a movable member, a spring assembly and an actuating assembly on the clamp body. The actuating assembly preferably includes a toggle member having oppositely facing knuckle elements thereon which are rotatably received in sockets for mounting the toggle member so that it is pivotable to actuate the spring assembly for biasing the movable member toward the clamping element. When the clamp is assembled in the coupling, and the receiver and the carrier are received in a coupled position between the clamping element and the movable member, the toggle member is pivotable to actuate the spring assembly for applying clamping pressures to the receiver and the carrier to secure them in the coupled position.

14 Claims, 11 Drawing Figures

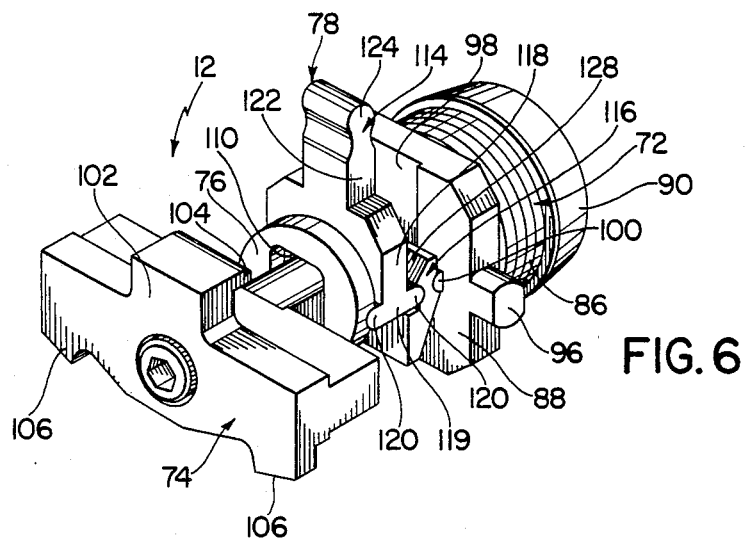
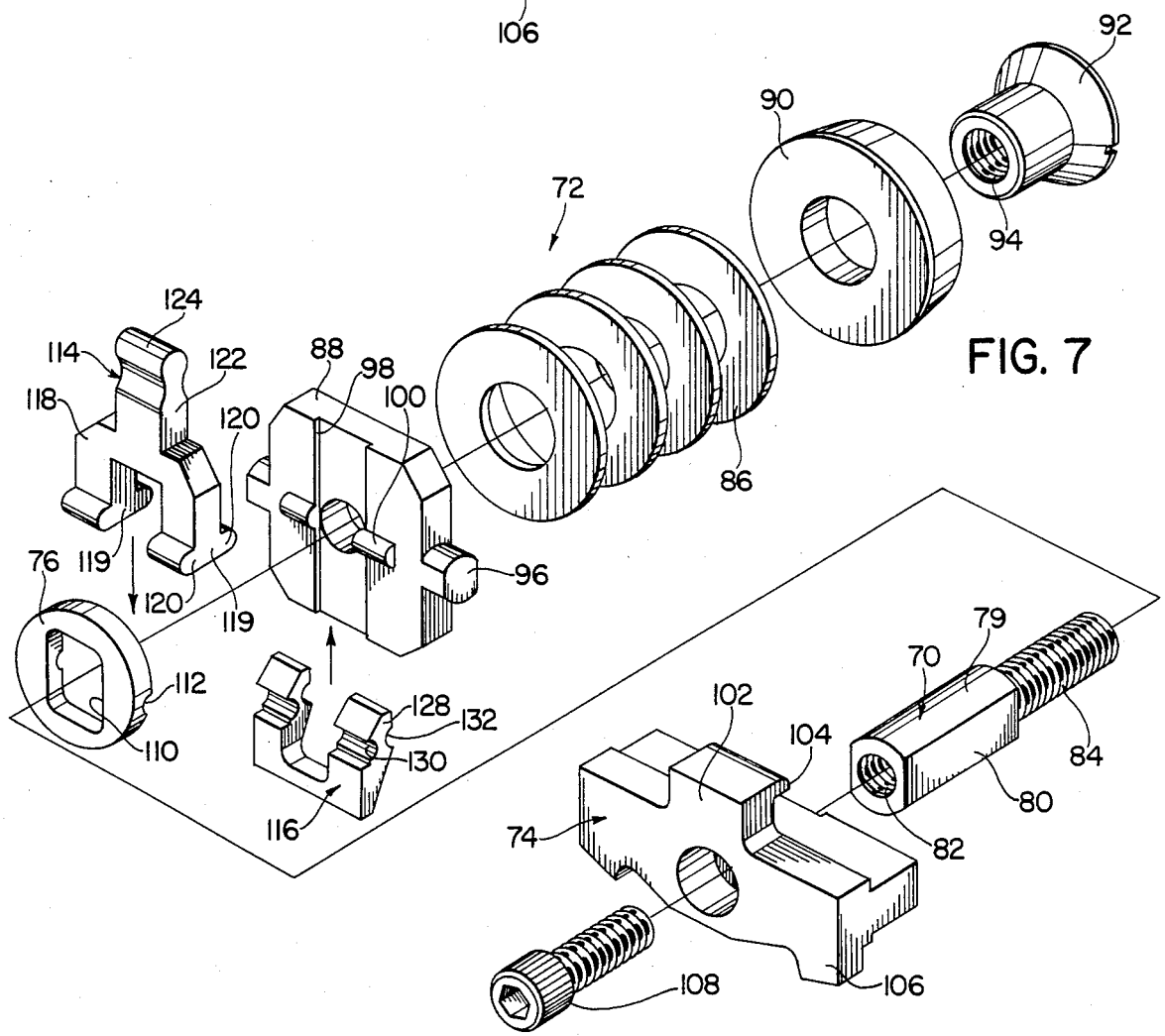

COUPLING CONSTRUCTION AND CLAMP THEREFOR

BACKGROUND AND SUMMARY OF THE INVENTION

The instant invention relates to the machine tool industry and, more particularly, to a coupling construction which is operable in a workholding system for securing a workpiece at a work station and to a clamp for securing receiver and carrier portions of the coupling in a coupled position.

It has been found that couplings of the type set forth in copending U.S. patent application Ser. No. 647,715, filed on Sept. 4, 1984 which issued as U.S. Pat. No. 4,575,062 on Mar. 11, 1986, can be effectively utilized in workholding systems for securing workpieces at sequential work stations and that they represent significant improvements in the art relating to workholding systems. In this regard, the coupling construction disclosed in application Ser. No. 647,715 comprises receiver and carrier portions which are receivable in a coupled position and which are particularly adapted for construction of the coupling with a reduced axial dimension, and a plurality of clamps for securing the receiver and the carrier portions of the coupling in the coupled position. For use and operation of a coupling of this type in a workholding system, a different receiver is secured at each of a plurality of sequential work stations and a workpiece which is to be sequentially machined at the work stations is secured on a carrier. The carrier and the workpiece are then sequentially secured to the different receivers at the different work stations for the performance of machining operations on the workpiece. It has been found that a coupling of this type can be effectively utilized for orienting a workpiece at sequential work stations and that because it is operative with a high degree of precision, many of the lengthy and time-consuming set up and adjustment procedures which have heretofore been required each time a workpiece is installed at a different work station can be eliminated. However, because it is desirable to clamp the receiver and carrier portions of a coupling of this type in a coupled position with extremely high clamping pressures in order to precisely and accurately maintain them in proper orientation, the clamps of a coupling of this type must be durable and easily actuatable to apply high clamping pressures to the receiver and carrier portions of the coupling to secure them in a coupled position.

The instant invention provides an improved coupling construction and an improved clamp for use in the coupling construction, wherein the clamp is effectively operable for applying extremely high clamping pressures to the receiver and carrier portions of the coupling in order to effectively maintain them in a coupled position. The clamp construction of the instant invention comprises a clamp body, a clamping member mounted on the clamp body, a movable or slide member mounted on the clamp body so that it is movable towards the clamping member, spring means actuatable for biasing the movable member toward the clamping member when an element to be clamped is received in engagement between the clamping member and the movable member, and means for actuating the spring means. The means for actuating the spring means comprises a toggle member and first, second, and preferably third knuckle and socket means which cooperate to mount the toggle member so that it is pivotable to actuate the spring means and so that the spring means communicates with the movable member through the first, second and third knuckle and socket means and the toggle member. In the preferred embodiment of the clamp, the first knuckle and socket means comprises a first knuckle element which is formed on an enlarged end of the toggle member, and a socket which is formed in the movable member and in which the first knuckle element is received, and the second knuckle and socket means comprises a second knuckle element which is formed on the opposite side of the toggle member end from the first knuckle element, and a pivot member having a second socket formed therein, the second knuckle element being received in the second socket. The third knuckle and socket means preferably comprises a third knuckle element formed on a retainer ring of the spring means and a third socket which is formed in the pivot element and in which the third knuckle element is received. The clamp is operable by pivoting the toggle member to move the movable member toward the clamping member until an object which is received between the movable and clamping members prevents further movement of the movable member towards the clamping member. Thereafter, when the toggle member is further pivoted to urge the movable member toward the clamping member, it operates to actuate the spring means to bias the movable member toward the clamping member. Throughout this operation, however, the elements of the clamp which are operative for providing communication between the spring means and the movable member, operate through the first, second and third knuckle and socket means for first moving the movable member toward the clamping member and for thereafter transmitting forces from the spring means to the movable member. Accordingly, the first, second and third knuckle and socket means provide a durable and effective means for transmitting forces from the spring means to the movable member. Specifically, because the knuckle elements rotate in their respective sockets as the toggle member is pivoted to urge the movable member towards the clamping member, the toggle member can be easily and reliably pivoted to actuate the spring means without causing excessive wear in the clamp.

Accordingly, because of the efficient and reliable manner in which the clamp of the instant invention is operable, it provides substantial advantages in the coupling construction of the instant invention. In this regard, the coupling construction of the instant invention comprises a receiver and a carrier which are securable in a coupled position, and at least one of the clamps of the instant invention which is operable for securing the receiver and the carrier in the coupled position. Preferably, the receiver and the carrier are formed so that they cooperate to define an open interior area in the coupling, and the coupling comprises a plurality of the clamps which are disposed in the open interior area so that they are engageable with the receiver and the carrier at a plurality of spaced points to firmly secure them in a coupled position. Accordingly, the clamps are operative for securing the receiver and the carrier in a coupled position, and the manner in which the clamps operate makes them effective and reliable for performing this function. Specifically, the manner in which the clamps operate makes them easily actuatable for applying high clamping pressures to the receiver and the carrier to positively secure them in the coupled position. In addition to the substantial improvements in the coupling provided by the clamp of the instant invention, the preferred embodiment of the coupling construction further comprises means for aligning the receiver and the carrier before the clamps are operated to secure the receiver and the carrier together, and a cam drive means which is operable from the exterior of the coupling for pivoting the toggle members of the clamps to actuate the respective spring means thereof. These features make the coupling construction of the instant invention even easier and faster to operate and hence they also represent significant improvement in the coupling. Accordingly, it is seen that the instant invention provides substantial improvements over the coupling construction and clamp disclosed in copending application Ser. No. 647,715, and that these improvements make the coupling and clamp of the instant invention operable with increased effectiveness in a workholding system for securing workpieces at sequential work stations. More specifically, these features increase the effectiveness of the coupling for use in both rotating and stationary machining applications and they further facilitate the transfer of workpieces from cubical machining settings to cylindrical machining settings.

It is, therefore, a primary object of the instant invention to provide an improved coupling construction for use in a workholding system.

Another object of the instant invention is to provide an improved clamp for use in a coupling construction, wherein the coupling construction is operable in a workholding system.

An even further object of the instant invention is to provide a clamp for use in a coupling construction, wherein the clamp is effectively operable for biasing receiver and carrier portions of the coupling together with high clamping pressures.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 6 is a perspective view of the clamp of the instant invention;

FIG. 7 is an exploded perspective view thereof; and

DESCRIPTION OF THE INVENTION

Figure 1:
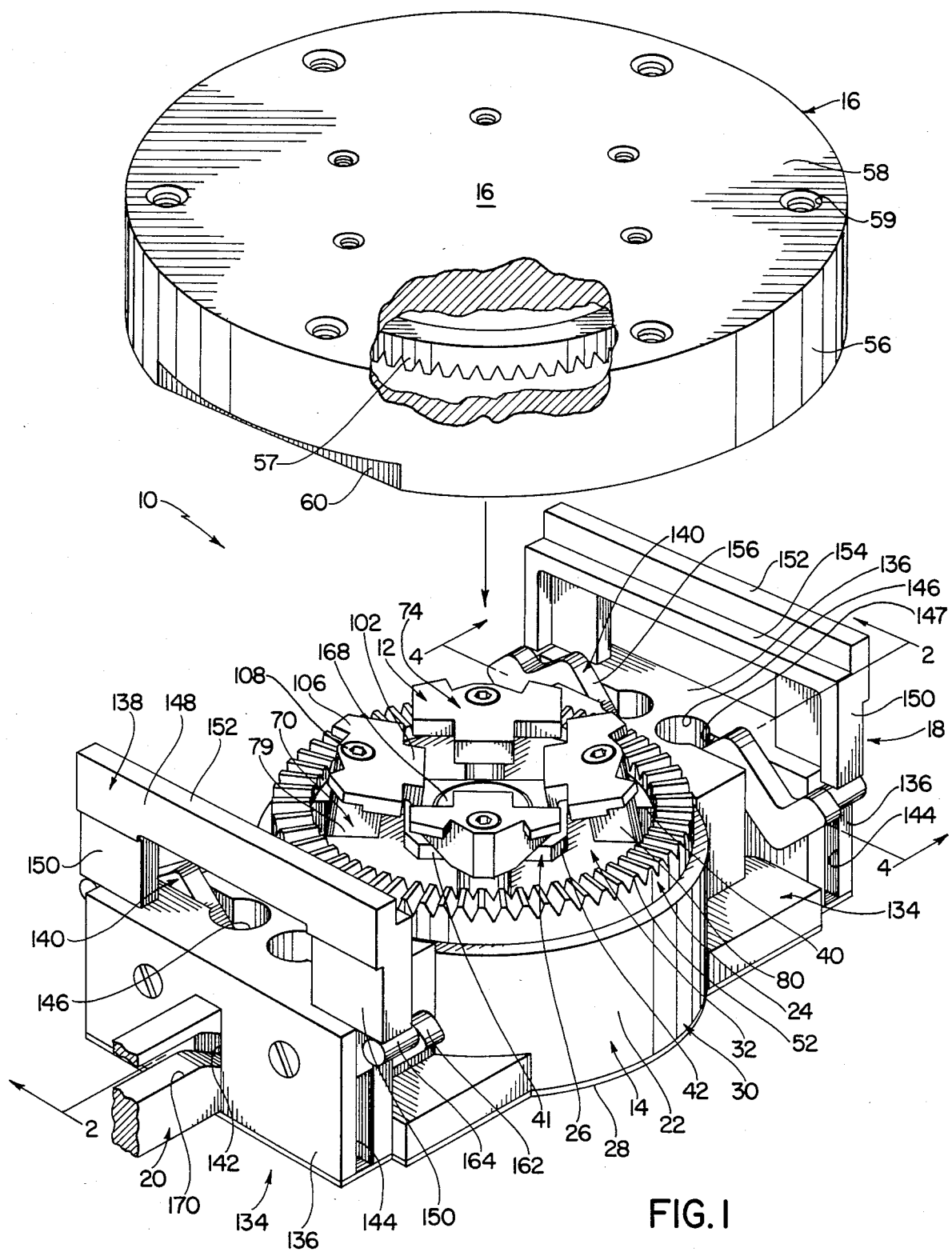
FIG. 1 is an exploded perspective view of the coupling construction of the instant invention.

Referring now to the drawings, the coupling construction of the instant invention is illustrated in FIGS. 1 through 5 and generally indicated at 10, and the clamp of the instant invention which is operative in the coupling 10 is illustrated in FIGS. 1-3, and 6-11, and generally indicated at 12. The coupling 10 comprises a receiver generally indicated at 14, a carrier generally indicated at 16, a plurality of the clamps 12, an alignment assembly generally indicated at 18, and a drive assembly generally indicated at 20. For use and operation of the coupling 10, the carrier 16 is positioned on the alignment assembly 18 so that it is generally aligned with the receiver 14 and the drive assembly 20 is operated to retract the alignment assembly 18 so that the carrier 16 is received in assembled engagement on the receiver 14, and the drive assembly 20 is then further operated to actuate the clamps 12 to clampingly secure the receiver 14 and the carrier 16 in assembled or coupled relation. Accordingly, when the receiver 14 is secured at a work station and a workpiece is secured on the carrier 16, the coupling 10 can be effectively utilized for accurately and precisely securing the workpiece in proper orientation at the work station for performing work on the workpiece.

Figure 2:
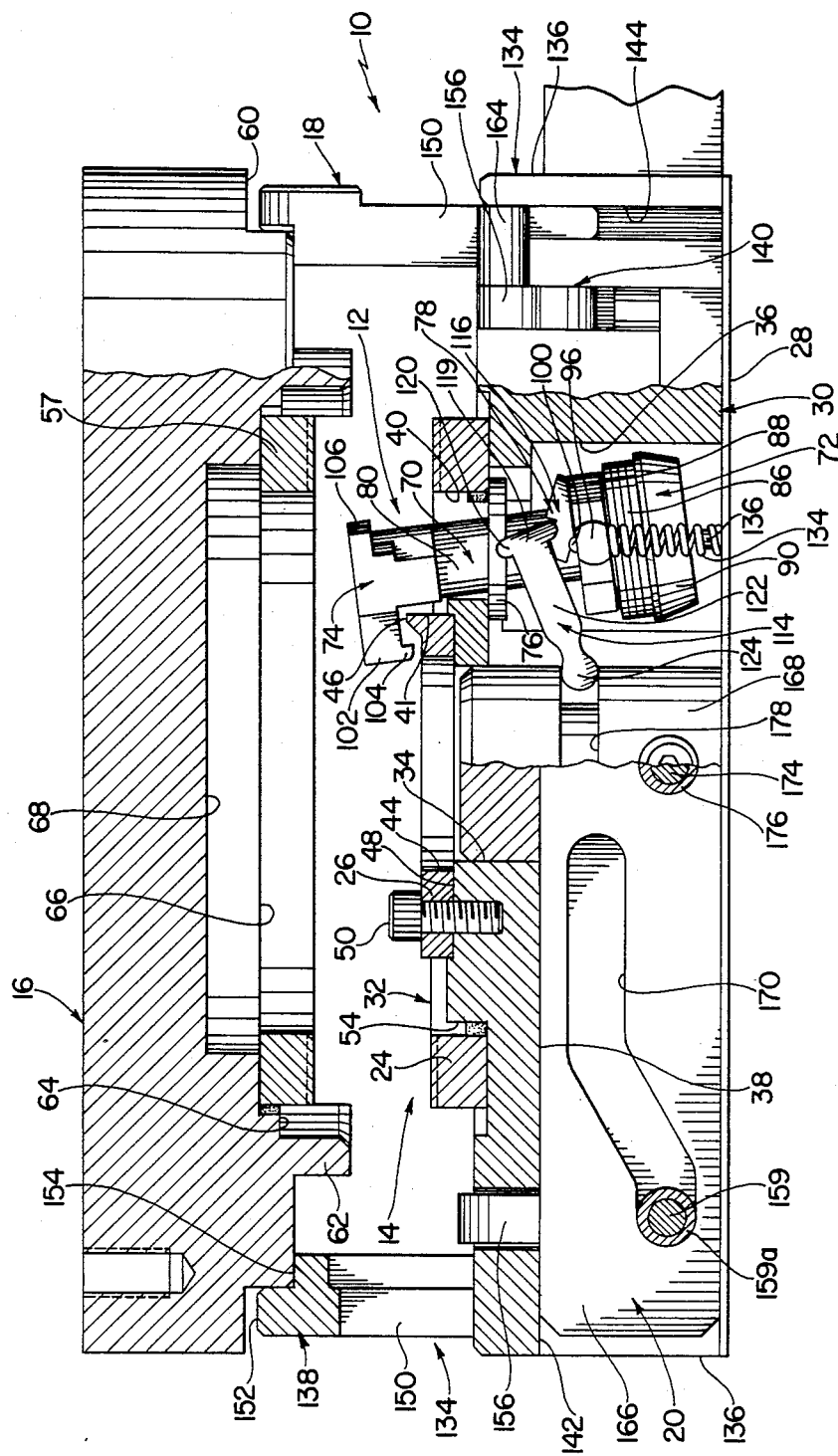
FIG. 2 is a cross-sectional view taken along line 2—2 in FIG. 1.
Figure 3:
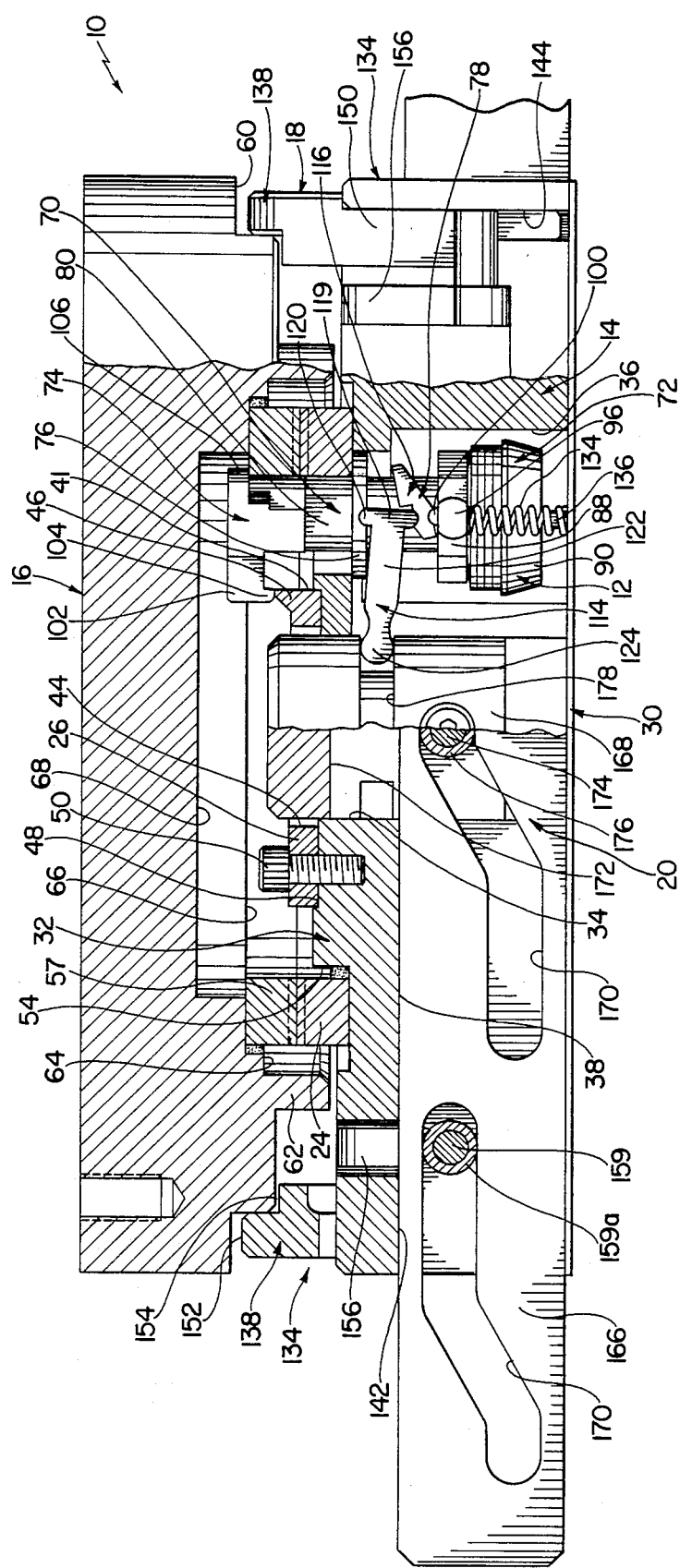
FIG. 3 is a similar view with the coupling in a coupled position.
Figures 4, 5:
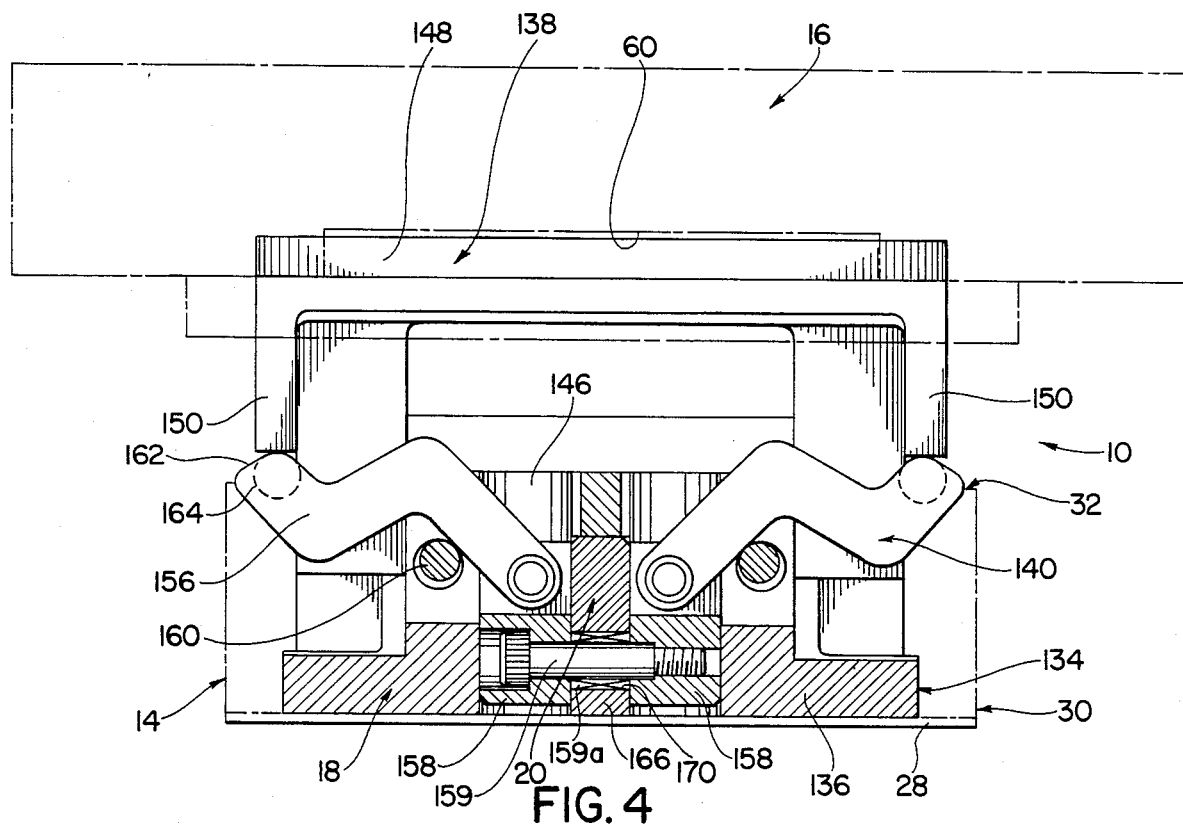
FIG. 4 is a sectional view taken along line 4—4 in FIG. 1.
FIG. 5 is a similar view with the coupling in a coupled position.
Figure 8:
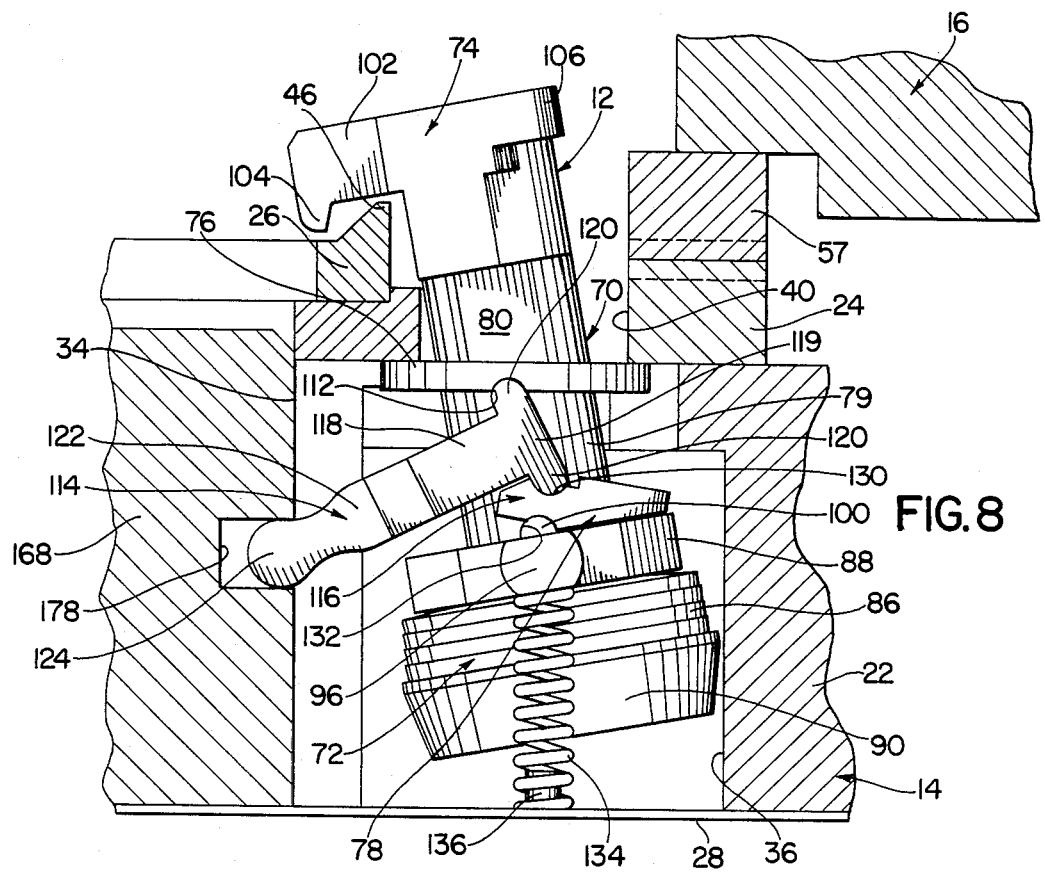
FIGS. 8-11 are enlarged sectional views illustrating the sequential operation of one of the clamps of the instant invention for securing the coupling in a coupled position.
Figure 9:
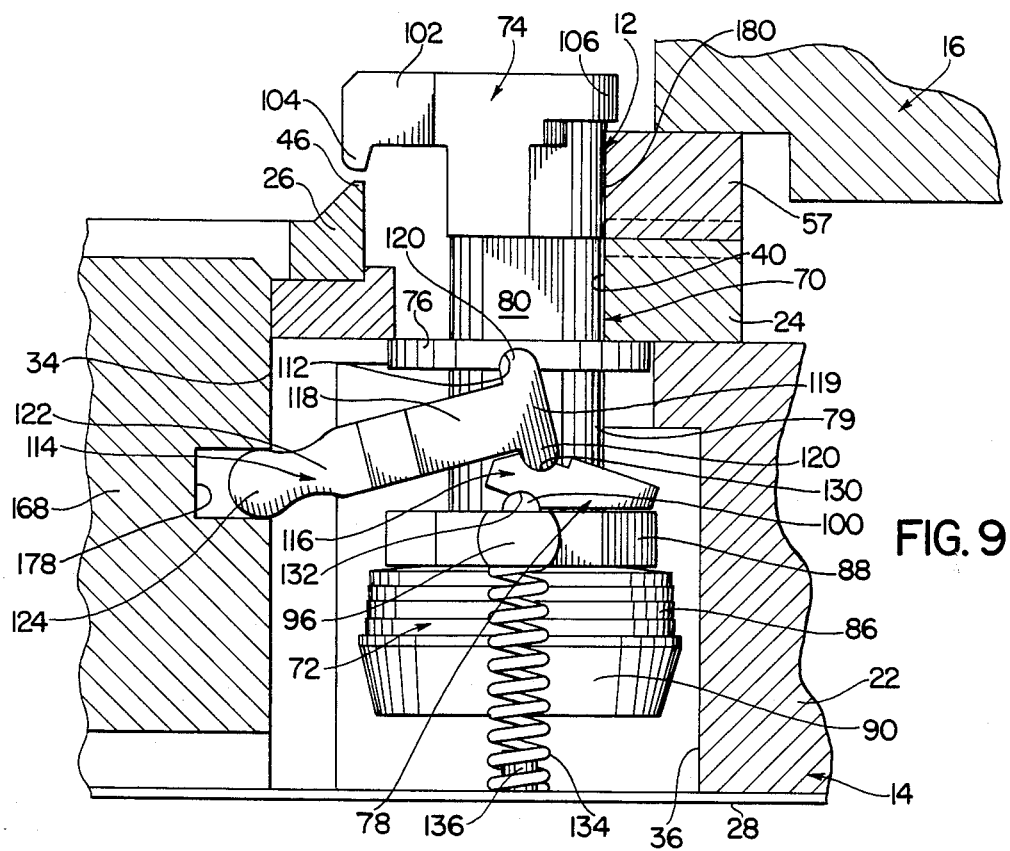
Figure 10:
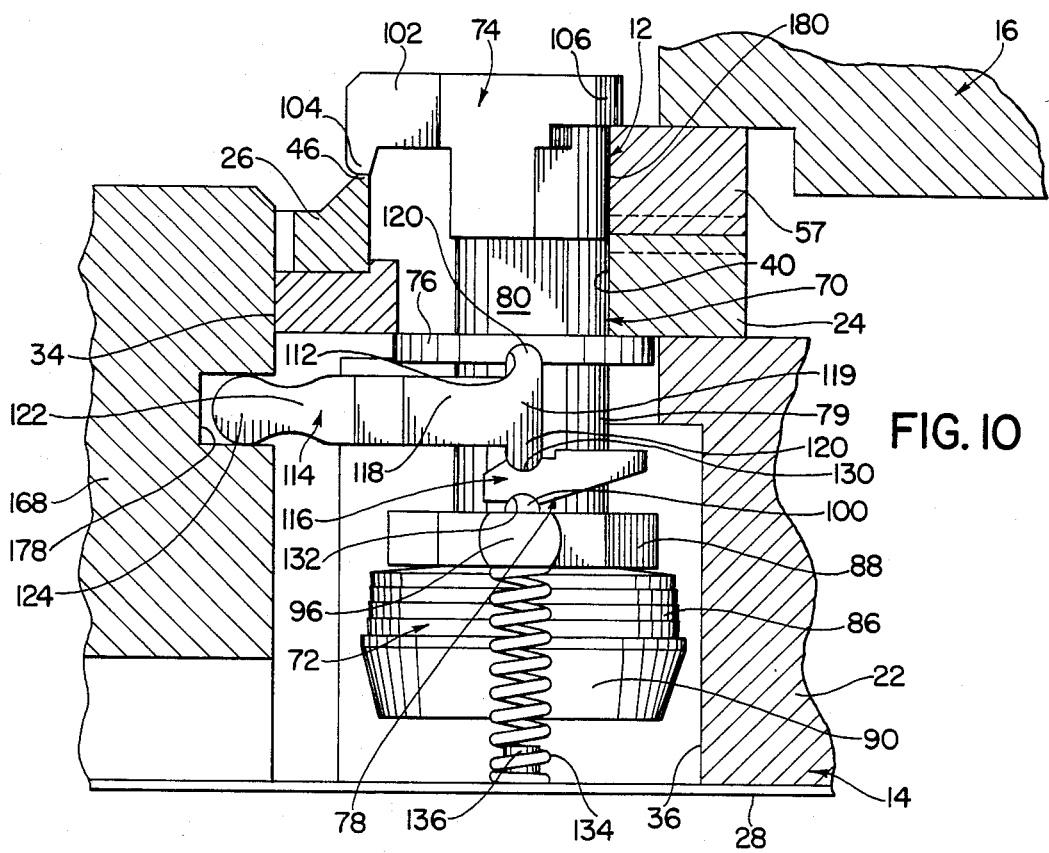

The receiver 14 is most clearly illustrated in FIGS. 1-3 and it comprises a cylindrical base 22, a multitoothed receiver coupling ring 24 which is mounted on the base 22, a shoulder ring 26 which is also mounted on the base 22, and an end plate 28 which is secured on the base 22. The base 22 is preferably of shortened cylindrical configuration and it has a first end 30 to which the plate 28 is secured and a second end 32 to which the shoulder ring 26 is secured. An enlarged axial bore 34 extends through the base 22 and a plurality of clamp compartments 36 are formed in the base 22 so that they communicate with the bore 34. An elongated slot 38 extends transversely through the base 22 so that it communicates with the bore 34, and a plurality of substantially rectangular openings 40 extend from the compartments 36 through the base 22 at the end 32 thereof. The shoulder ring 26 is formed in a generally square configuration with sides 41, and flattened or blunt corners 42. A central bore 44 extends through the shoulder ring 26 and a shoulder 46 is formed along each of the sides 41 of the ring 26. The shoulder ring 26 is secured in a recess 48 in the second end 32 of the base 22 by means of screws 50, the ring 26 being positioned so that the bore 44 is substantially coaxial with the bore 34. The multitoothed receiver ring 24 preferably comprises a substantially circular ring having a plurality of teeth 52 thereon which are preferably substantially radially oriented and are preferably either of Curvic (Gleason TM) or Hirth configurations. The ring 24, which defines a coupling surface of the receiver 14, is received in a circular recess 54 in the second end 32 of the base 22 and it is positioned in substantially concentric relation with the bore 34, and in outwardly spaced relation to the shoulder ring 26, and so that it defines the outer extremities of the rectangular openings 40.

The carrier 16 comprises a carrier element 56 which is preferably of shortened cylindrical configuration and a multitoothed carrier ring 57 which is secured on the element 56. One end of the carrier element 56 is defined by a substantially flat outer surface 58 having a plurality of threaded openings 59 therein for securing a workpiece on the carrier 16. A pair of substantially straight outer peripheral channels 60 are formed in opposite outer peripheral side portions of the carrier element 56 adjacent the end thereof which is opposite the surface 58, and a circular ring 62 projects from the same end to define a substantially circular first recess 64 in the carrier element 56. A second recess 66 which has a slightly smaller diameter than the recess 64 is formed in the carrier element 56 in concentric relation to the recess 64 and a third circular recess 68 of still further reduced diameter is formed within the recess 66. The multitoothed ring 57 defines a coupling surface of the carrier 16 and it is preferably formed in a complimentary configuration to the multitoothed receiver ring 24. The multitoothed ring 57 is received and secured in the recess 66 so that it extends a distance over the outer peripheral portion of the recess 68 and it is positioned so that when the carrier 16 is positioned in substantially concentric relation to the receiver 14, the multitoothed rings 57 and 24 are receivable in mating interengagement as illustrated in FIG. 3.

Referring now to FIGS. 6-11, one of the clamps 12 is more clearly illustrated. As will be seen, each of the clamps 12 comprises a clamp body 70, a spring assembly generally indicated at 72 which is secured on one end of the respective body 70, a clamping element generally indicated at 74 which is secured on the opposite end of the respective body 70, and a movable or slide ring 76 which is slidably received on the respective body 70. Each of the clamps 12 further comprises an actuator assembly 78 which is disposed adjacent the respective body 70 between the slide ring 76 and the spring assembly 72, and which is operative with a double toggle action for urging the respective slide ring 76 toward the respective clamping element 74 in order to secure the receiver 14 and the carrier 16 in biased engagement. The body 70 of each of the clamps 12 comprises an elongated member having a main portion 79 with flattened sides 80. A threaded opening 82 formed in one end of the main portion 79 of each of the bodies 70, and a stud 84 extends integrally from the opposite end of each thereof. Each of the spring assemblies 72 comprises a plurality of resilient, concave Bellville washers 86, a retainer ring 88, a circular end piece 90, and an end plug 92 having a threaded opening 94 therein. Extending outwardly from opposite peripheral edges of each of the retainer rings 88 are support elements 96, a channel 98 extends transversely across the central portion of one side of each of the retainer rings 88, and a pair of elongated knuckle elements 100 extend outwardly from opposite sides of the central portions of each of the channels 98 in substantially aligned relation with the respective support elements 96. Each of the retainer rings 88 is slidably received on the respective stud 84 so that it abuts the end of the respective main body portion 79 and so that the knuckle elements 100 thereof are disposed adjacent the flat sides 80 of the respective body 70. The Bellville washers 86 and the end pieces 90 are also received on the respective studs 84, and the end plugs 92 are threadedly received on the ends of the respective studs 84 to secure the end pieces 90 and the washers 86 thereon. In this regard, each of the plugs 92 is preferably received on its respective stud 84 so that the concave Bellville washers 86 of the respective clamp 12 are resiliently compressed slightly between the respective end pieces 90 and the respective retainer rings 88 and thereby preloaded to a certain extent. Each of the clamping elements 74 comprises a shoulder arm 102 having an elongated foot 104 formed thereon, and a pair of clamping arms 106 which project outwardly form the opposite side of the respective clamping element 74 form the shoulder arm 102 thereof. Each of the clamping elements 74 is received on the opposite end of the respective body 70 from the respective spring assembly 72 and secured thereon with a machine screw 108 which is threadedly received in the respective opening 82. The slide rings 76 each comprise a ring-like element having a generally rectangular opening 110 formed therein which is of slightly greater dimension than the sectional dimension of the main portion 79 of the respective body 70. Also formed in each of the slide rings 70 is a rounded notch or socket 112 which extends across one side thereof. Each of the slide rings 76 is assembled in the respective clamp 12 so that the respecive body portion 79 extends slidably through the opening 110 thereon. Each of the actuator assemblies 78 comprises a yoke-like toggle member 114 and a pivot element 116. Each of the toggle members 114 includes a pair of spaced substantially parallel legs 118 which each have an enlarged terminal end 119 having a pair of knuckle elements 120 formed on opposite sides thereof. The toggle members 114 each further comprise a stem portion 122 which extends from the legs 118 thereof and preferably terminates in a rounded end 124. The pivot element 116 of each of the clamps 112 is formed in a generally U-shaped configuration, and it includes a pair of spaced legs 128 which are positioned adjacent opposite sides 80 of the respective main body portion 79. Each of the pivot elements 116 is further formed with a first elongated socket or rounded notch 130 therein which extends across one side of the respective legs 128, and a second elongated socket or rounded notch 132 which extends across the opposite side of the respective legs 128. In addition, each of the pivot elements 116 is formed in a generally wedge-shaped configuration and the respective sockets 130 and 132 thereon are positioned so that they are in substantially parallel relation to each other, but in slightly offset relation on the opposite sides of the respective legs 128. Each of the actuator assemblies 78 is assembled on the main portion 79 of its respective body 70 so that the legs 118 thereof are disposed adjacent opposite sides 80 and so that the knuckle elements 120 on one side of the respective legs 118 are received in the socket 112 in the respective slide ring 76. Each of the pivot elements 116 is also received on the respective main body portion 79 so that the legs 128 thereof are disposed adjacent opposite sides 80 and the knuckle elements 120 on the other side of each of the toggle members 114 are received in the sockets 130 in the respective pivot elements 116. The knuckle elements 100 on the retainer rings 88 are received in the sockets 132 on the respective pivot elements 116. Accordingly, each of the toggle members 114 is pivotally mounted in its respective clamp 12 so that it is pivotable to move the respective slide ring 76 of the clamp 12 away from the respective pivot element 116 and spring assembly 72 thereof. Further, when one of the toggle members 114 is pivoted in this manner, it causes the respective ends 119 thereof to be positioned so that they are substantially parallel to the axis of the respective body 70, whereby the respective slide ring 76 is moved away from the respective spring assembly 72 and the respective pivot element 116. Accordingly, when an element or assembly to be clamped is received in engagement between one of the movable elements 76 and the respective clamping element 74, and the respective toggle element 114 is pivoted in the respective actuator assembly 78, the respective retainer ring 88 is moved toward the respective end piece 90, causing the Bellville washers 86 of the clamp 12 to be further loaded, and causing the respective slide ring 76 thereof to be biased toward the respective clamping element 74 by the respective spring assembly 72 through the respective actuator assembly 78.

As illustrated most clearly in FIGS. 1-3, the clamps 12 are received in the compartments 36 in the receiver 14 so that the stems 122 project inwardly into the bore 34 and so that the main body portions 79 extend through the openings 40. The slide rings 76 are disposed in the compartments 36 so that they engage the receiver 14 adjacent their respective openings 40 and the clamping elements 74 are disposed adjacent the outer ends of the openings 40. The clamps 12 are mounted in the compartments 36 on mounting springs 134 which extend between the end plate 28 and the mounting elements 96 on the retainer rings 88. The springs 134 are retained in position by means of studs 136 which are secured on the plate 28 and they are operative for positioning the clamps 12 so that the slide rings 76 thereof engage the receiver 14 adjacent the openings 40 in the compartments 36 as illustrated most clearly in FIG. 3. Further, the clamps 12 are configured and dimensioned so that when they are mounted in the compartments 36 in this manner and the carrier 16 is assembled on the receiver 14, the feet 104 on the clamping elements 74 are engageable with the shoulders 46 on the shoulder ring 26 and the clamping arms 106 are engageable with the multi-toothed carrier ring 57 in the recess 66 to bias the rings 57 and 24 together. Accordingly, when the actuator assemblies 78 are actuated, the clamps 12 are operative for applying direct clamping pressures to the multi-toothed carrier and receiver rings 57 and 24, respectively, to secure the receiver 16 and the carrier 14 in engagement.

The alignment assembly 18 is illustrated in FIGS. 1-5, and it comprises a pair of substantially identical subassemblies generally indicated at 134 which are secured on opposite sides of the receiver 14. Each of the subassemblies 134 comprises a main body 136, an alignment shelf 138, and a pair of actuating arm assemblies generally indicated at 140. Each of the main bodies 136 is formed with an elongated slot 142 therein which extends in substantially aligned relation from the slot 38 in the receiver 14 and a pair of tracks 144 which are formed on opposite sides of each of the bodies 136 so that they extend in substantially perpendicular relation to the slots 142. Also formed in each of the bodies 136 is a pair of substantially parallel cylindrical passages 146 which are positioned so that they extend along opposite sides of the respective slot 142 in substantially perpendicular relation therewith and communicate with the opposite sides thereof, and a pair of enlarged slots 147 which extend outwardly from the opposite sides each of the slots 142 are also formed in the bodies 136. The alignment shelves 138 each comprise a shelf member 148 and a pair of legs 150 which extend from the respective shelf member 148 thereof. The legs 150 are slidably received in the tracks 144 for moving the respective shelf member 148 attached thereto between an extended position wherein it is spaced from the respective body 126 and a retracted position wherein it is positioned adjacent the respective body 136. Each of the shelf members 148 has a substantially flat shelf surface 152 thereon, and an inner recessed shelf surface 154 which is substantially parallel to, but disposed inwardly and recessed with respect to the adjacent shelf surface 152. The actuating arm assemblies 140 are most clearly illustrated in FIGS. 4 and 5, and they each comprise an arm 156 which is pivotally secured at its inner end to a cylindrical piston 158 which is slidably received in the adjacent passage 146. The pistons 158 of each of the subassemblies 134 are interconnected by means of a cam screw 159 having a sleeve 159a thereon. Each of the arms 156 extends outwardly from the respective piston 158 to which it is attached through the adjacent slot 147 wherein it engages a fulcrum element 160 for pivoting the respective arm 156 so that the outer end thereof moves in the opposite direction from the respective piston 158. Each of the arms 156 terminates in an end 162 having a cylindrical element 164 thereon which is positioned in engagement with the adjacent leg 150 of the respective alignment shelf 138. Accordingly, when the pistons 158 of the subassemblies 134 are moved in the passages 146 thereof, they operate to pivot the arms 156 connected thereto to move the respective alignment shelf 138 between the extended position thereof illustrated in FIGS. 2 and 4, and the retracted position thereof illustrated in FIGS. 3 and 5.

The drive assembly 20 is also illustrated in FIGS. 1-5, and it comprises a cam bar 166 and a drive member or drive piston 168. The cam bar 166 comprises an elongated bar having three cam slots 170 formed therein. The cam bar 166 extends slidably through the slots 142 and 38 so that it extends substantially transversely through the receiver 14. Each of the cam screws 159 with the respective sleeve 159a thereon extends through one of the cam slots 170 in the cam bar 166. Hence, when the cam bar 166 is moved longitudinally in the slots 142 and 38, the cam screws 159 are repositioned in their respective slots 170 to longitudinally move the pistons 158 in their respective passages 146 in order to move the alignment shelves 138 between the extended and the retracted positions thereof. The drive piston 168 is slidably received in the axial bore 34 in the receiver 14, and it is formed with an enlarged slot 172 which extends transversely therethrough, the slot 172 being dimensioned to slidably receive the cam bar 166. The cam bar 166 extends slidably through the slot 172 and a cam screw 174 having a sleeve 176 thereon is attached to the piston 168 so that it extends across the slot 172 therein and is received in the middle slot 170 in the cam bar 166. Accordingly, the piston 168 is moved axially in the bore 34 as the cam bar 166 is longitudinally moved in the receiver 16. The piston 168 is further formed with an annular groove 178 therein and the rounded ends 124 of the stem portions 122 of the clamps 12 are received in the groove 178. Accordingly, when the piston 168 is moved in the bore 34, it is operative for pivoting the toggle members 114 of the clamps 12 for actuating the actuating assemblies 78 thereof.

Figure 11:
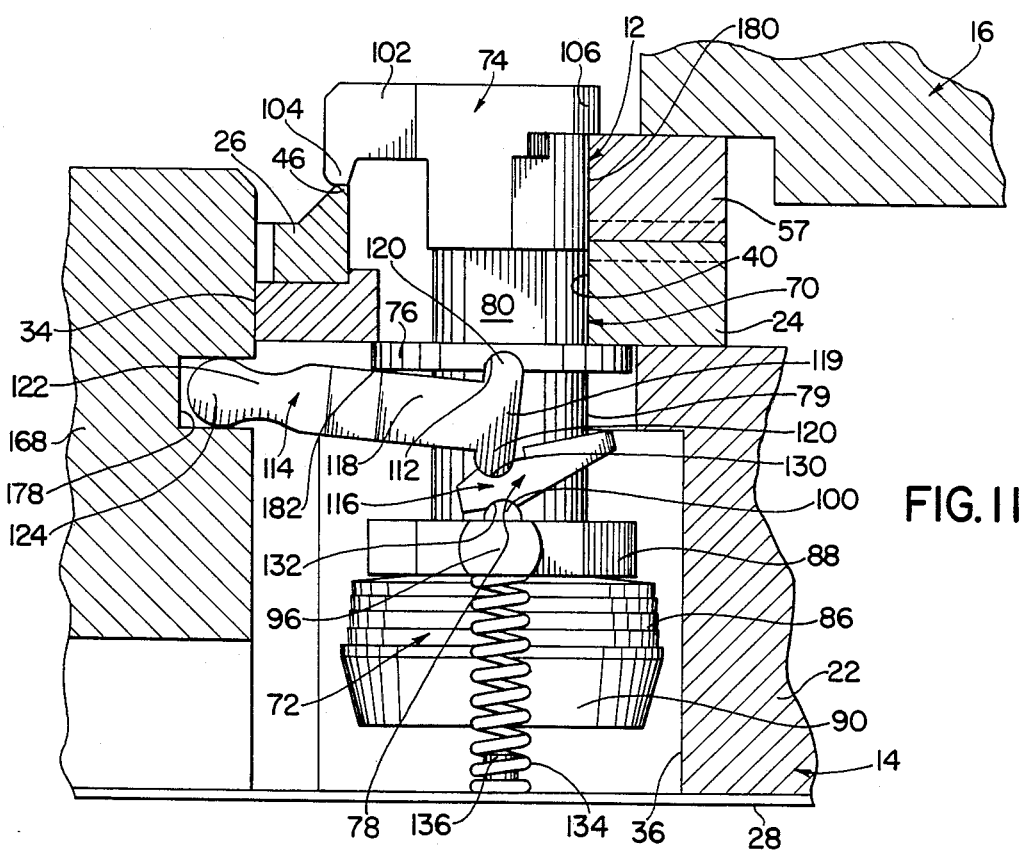

Referring now to FIGS. 8-11, the operation of one of the clamps 12 is more clearly illustrated. As will be seen, the clamps 12 are operable between the unactuated position illustrated in FIG. 8 and the fully actuated position illustrated in FIG. 11. When the clamps 12 are in the unactuated positions thereof, the toggle members 114 thereof are pivoted toward the spring assemblies 72 thereof and the entire clamps 12 are axially pivoted slightly on their respective springs 134 in the respective compartments 36 in which they are mounted. Further, when the clamps 12 are in the unactuated positons, the clamping elements 74 thereof are moved inwardly so that the feet 104 of the clamping elements 74 are disposed inwardly of the adjacent shoulders 46 and the clamping arms 106 are disposed inwardly of the multitoothed rings 57 and 24. Accordingly, when the clamps 12 are in this position, the carrier 16 can be easily disassembled from, and assembled on, the receiver 14. In order to move the clamps 12 toward the actuated positions thereof, the cam bar 166 is moved longitudinally in the slots 38 and 146 so that the piston 168 is moved away from the end plate 28. This causes the ends 124 of the toggle members 114 to be also moved away from the end plate 28 to move the clamps 12 to the positions thereof illustrated in FIG. 9, wherein the bodies 70 thereof are substantially parallel to the axis of the receiver 14. When the clamps 12 are in this position, the clamping elements 74 thereof engage the receiver 14 as at 180 to prevent the clamps 12 from being pivoted further. In addition, when the clamps 12 are in this position, the clamping arms 106 thereof are aligned with the multitoothed carrier ring 57 and the feet 104 are aligned with the adjacent shoulders 46. When the piston 168 is then moved further away from the plate 28, the toggle members 114 are pivoted in the actuating assemblies 78 thereof to the position illustrated in FIG. 10. As will be seen, when the toggle members 114 are pivoted in this manner, the ends 119 thereof are moved into positions wherein they are substantially parallel with the axes of their respective bodies 70 and the pivot elements 116 are also pivoted, and as a result the respective slide members 76 and the retaining pieces 88 are forced apart. During the first portion of the movement of the clamps 12 to the positions thereof illustrated in FIG. 10, the clamping elements 74 are moved into engagement with the adjacent shoulders 46 and the multitoothed ring 57. However, after the clamps have been moved into engagement with the respective shoulders 46 and the ring 57, additional movement of the toggle members 114 thereof to advance the ends 119 thereof toward positions wherein they are aligned with the axes of the respective bodies 70 of the clamps 12, causes the retaining rings 88 to be moved toward the respective end pieces 90 so that the Bellville washers 86 are resiliently compressed to bias the clamping elements 74 of the clamps 12 toward the slide members 76 thereof. Accordingly, this causes the multitoothed rings 57 and 24 to be secured in biased engagement with relatively high clamping pressures so that the carrier 16 is firmly and accurately secured on the receiver 14. As illustrated in FIG. 11, when the pistons 168 are thereafter moved further away from the plate 28 until the toggle members 114 engage the slide members 76 as at 182, the ends 119 are moved slightly beyond the positions thereof wherein they are aligned with the bodies 70 and the pivot elements 116 are pivoted still further. This provides a locked position, wherein the forces on the toggle members 114 of the clamps 12 cause the stem portions 122 thereof to be urged against the respective slide rings 76 so that they are naturally retained against further movement. When the toggle members 114 are in this position, the ends 119 thereof are slightly out of alignment with the respective bodies 70, but they are close enough to aligned positions so that the clamps 12 maintain high degrees of clamping pressures on the multitoothed rings 57 and 24 to firmly secure the carrier 16 on the receiver 14.

Accordingly, for use and operation of the coupling 10, a workpiece is secured on the carrier 16 and the receiver 14 is secured at a work station. In order to secure the workpiece at the work station, the drive assembly 20 is operated to position the clamps 12 in the unactuated positions thereof, and to position the alignment assemblies 18 in the extended positions thereof illustrated in FIGS. 1 and 2. The carrier 16 is then positioned on the alignment shelves 138 so that the shelves 138 are received in the channels 60 and so that the carrier 16 is supported on the inner shelf surfaces 154. The cam bar 166 is then advanced in the slots 142 and 38 to first move the shelves 138 to the retracted positions thereof so that the multitoothed carrier ring 57 is received in engagement with the multitoothed receiver ring 24. As the cam bar 166 is further advanced in the slots 142 and 38, the piston 168 is moved away from the plate 28 to actuate the clamps 12 so that they are first moved into alignment with the ring 57 and the adjacent shoulders 46 and then moved into biased engagement therewith to firmly secure the multitoothed rings 57 and 24 in biased engagement. In this manner, the carrier 16 is quickly and firmly secured on the receiver 14 so that work can be accurately performed on the workpiece which is secured on the carrier 16. Further, after the work on the workpiece has been completed, the carrier 16 and the workpiece can be quickly and easily disengaged from the receiver 14 and assembled on another receiver 14 at a different work station to perform additional work on the workpiece.

It is seen therefore that the instant invention provides an effective and reliable coupling construction and clamp for use in a workholding system. Because of the effective and accurate way in which the receiver and carrier portions of the coupling are securable in a coupled position, many of the time consuming, set-up, and adjustment procedures which have been required at work stations prior to the performance of work on work pieces can be eliminated. Further, because of the effective and reliable way in which the actuating assemblies 78 of the clamps 12 are operative for transmitting forces from the Bellville washers 86 thereof to the slide members 76 and clamping elements 74 thereof, the clamps 12 can be effectively and reliably utilized in the coupling 10 without wearing excessively. The alignment assembly 18 makes it easier and faster to assemble the coupling 16 with the receiver 14 and the drive assembly 20 provides an effective means of carrying out the assembly of the coupling 10. Hence, it is seen that for these reasons as well as the other reasons hereinabove set forth, the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a coupling construction of the type comprising a receiver and a carrier which are securable in a coupled position and a clamp for securing said receiver and said carrier in said coupled position wherein the clamp comprises a clamp body, a clamping member mounted on said clamp body, a movable member mounted on said clamp body so that it is movable toward said clamping member, spring means actuatable for biasing said movable member toward said clamping member, means operable for positioning said clamp body so that said movable member is adjacent one of said carrier or said receiver, and said clamping member is adjacent the other of said carrier or said receiver and means for actuating said spring means to bias said movable member toward said clamping member to clampingly secure said carrier and said receiver in said coupled position, the improvement comprising said actuating means comprising a toggle member and first and second knuckle and socket means, said first and second knuckle and socket means cooperating to mount said toggle member so that it is pivotable to actuate said spring means and so that said spring means communicates with said movable member through said toggle member and said first and second knuckle and socket means to bias said movable member toward said clamping member.

2. In the coupling construction of claim 1, said actuating means further comprising third knuckle and socket means, said third knuckle and socket means cooperating with said first and second knuckle and socket means to mount said toggle member so that it is pivotable to actuate said spring means and so that said spring means communicates with said movable member through said toggle member and said first, second, and third knuckle and socket means.

3. In the coupling construction of claim 1, said first knuckle and socket means further characterized as a first knuckle element formed on said toggle member and a first socket formed in said movable member, said first knuckle element being received in said first socket, said second knuckle and socket means comprising a second knuckle element formed on said toggle member so that it faces generally opposite from said first knuckle element and a movable pivot element having a second socket formed therein, said second knuckle element being received in said second socket, said toggle member being interposed between said movable member and said spring means and being pivotable to move said movable member away from said pivot element for actuating said spring means.

4. In the coupling construction of claim 3, said actuating means further comprising third knuckle and socket means, said third knuckle and socket means cooperating with said first and second knuckle and socket means to mount said toggle member so that it is pivotable to actuate said spring means and so that said spring means communicates with said movable member through said toggle member and said first, second, and third knuckle and socket means.

5. In the coupling construction of claim 4, said third knuckle and socket means further characterized as a third knuckle element and a third socket formed in said pivot element on substantially the opposite side thereof from said second socket, said third knuckle element being received in said third socket, said pivot element being interposed between said second and third knuckle elements.

6. In the coupling construction of claim 5, said spring means comprising a retainer ring slidably received on said body, said third toggle element being formed on said retainer ring, said actuating means being operative for slidably moving said retainer ring relative to said body to actuate said spring means.

7. In the coupling construction of claim 1, said actuating means further comprising third knuckle and socket means, said spring means communicating with said movable member through said first, second, and third knuckle and socket means, and said toggle member, said toggle member being pivotable to move said movable member away from said spring means for actuating said spring means.

8. The coupling construction of claim 1 further comprising means for aligning said carrier with said receiver prior to the actuation of said spring means.

9. In the coupling construction of claim 1, said receiver and said carrier cooperating to define an open interior area in said coupling, said clamp being disposed in said open interior area, said couping construction further comprising cam drive means operable from the exterior of said coupling for pivoting said toggle member to actuate said spring means.

10. In the coupling construction of claim 9, said cam drive means comprising a cam bar which extends from the exterior of said receiver to said open interior area and a drive member in said open interior area, said drive member communicating with said toggle member and being movable from an unactuated position to an actuated position for pivoting said toggle member to actuate said spring means, said cam bar being slidable in said receiver to communicate with said drive member in a camming relation to move said drive member from said unactuated position thereof to said actuated position thereof.

11. In a clamp construction comprising a clamp body, a clamping member on said clamp body, a movable member mounted on said clamp body so that it is movable toward said clamping member, spring means actuatable for biasing said movable member toward said clamping member when an element to be clamped is received in engagement between said clamping member and said movable member, and means for actuating said spring means to bias said movable member toward said clamping member, the improvement comprising said actuating means comprising a toggle member, a first knuckle element formed on said toggle member, said movable member having a first socket formed therein, said first knuckle element being received in said first socket, a second knuckle element formed on said toggle member so that it faces generally opposite from said first knuckle element, and a movable pivot element having a second socket formed therein, said second knuckle element being received in said second socket, said toggle member being interposed between said movable member and said spring means and being pivotable to move said movable member away from said pivot element for actuating said spring means so that said spring means communicates with said movable member through said toggle member to bias said movable member toward said clamping member.

12. In the clamp construction of claim 11, said actuating means further comprising third knuckle and socket means, said third knuckle and socket means cooperating with said first and second knuckle and socket means to mount said toggle member so that it is pivotable to actuate said spring means and so that said spring means communicates with said movable member through said toggle member and said first, second, and third knuckle and socket means.

13. In the clamp construction of claim 12, said third knuckle and socket means further characterized as a third knuckle element and a third socket formed in said pivot element on substantially the opposite side thereof from said second socket, said third knuckle element being received in said third socket, said pivot element being interposed between said second and third knuckle elements.

14. In the clamp construction of claim 13, said spring means further comprising a retainer ring slidably received on said body, said third toggle element being formed on said retainer ring, said actuating means being operative for slidably moving said retainer ring relative to said body to actuate said spring means.

* * * * *